(12) United States Patent
Dygert

(10) Patent No.: US 6,954,469 B1
(45) Date of Patent: Oct. 11, 2005

(54) MULTI-CHANNEL VIDEO PUMP

(75) Inventor: Timothy W Dygert, Columbia, IN (US)

(73) Assignee: Digital Networks North America, Inc., Santa Clara, CA (US)

( * ) Notice: Subject to any disclaimer, the term of this patent is extended or adjusted under 35 U.S.C. 154(b) by 0 days.

(21) Appl. No.: 09/478,407

(22) Filed: Jan. 6, 2000

Related U.S. Application Data

(63) Continuation-in-part of application No. 09/226,169, filed on Jan. 7, 1999, now Pat. No. 6,473,441.

(60) Provisional application No. 60/112,866, filed on Dec. 18, 1998.

(51) Int. Cl.$^7$ ............................................... H04J 3/18
(52) U.S. Cl. ........................ 370/477; 386/84; 725/148
(58) Field of Search .............................. 370/503–521, 370/477, 465, 464; 386/84, 109, 123; 725/118, 725/135, 143, 148

(56) References Cited

U.S. PATENT DOCUMENTS

| | | | |
|---|---|---|---|
| 5,486,864 A * | 1/1996 | Zdepski ................... 348/423.1 |
| 5,668,841 A * | 9/1997 | Haskell et al. .............. 375/371 |
| 5,828,670 A * | 10/1998 | Narasimha et al. .......... 370/516 |
| 5,859,949 A * | 1/1999 | Yanagihara .................. 386/68 |
| 5,881,245 A * | 3/1999 | Thompson .................. 709/219 |
| 5,892,535 A * | 4/1999 | Allen et al. ................... 725/36 |
| 5,966,387 A * | 10/1999 | Cloutier ..................... 370/516 |
| 6,011,899 A * | 1/2000 | Ohishi et al. ................. 386/98 |
| 6,122,123 A * | 9/2000 | Saeijs et al. .................. 360/51 |
| 6,138,147 A * | 10/2000 | Weaver et al. .............. 709/206 |
| 6,292,621 B1 * | 9/2001 | Tanaka et al. ................ 386/56 |
| 6,434,562 B1 * | 8/2002 | Pennywitt et al. ............ 707/10 |
| 6,473,441 B1 * | 10/2002 | Dygert ....................... 370/516 |
| 6,493,832 B1 * | 12/2002 | Itakura et al. .............. 713/600 |

* cited by examiner

*Primary Examiner*—David Vincent
(74) *Attorney, Agent, or Firm*—McDonnell Boehnen Hulbert & Berghoff LLP

(57) ABSTRACT

A system for streaming a plurality of video or other recorded signals from storage to receiving devices maintains each of the signal streams at their encoded bit rate. The bit rate of each stream is detected from the stored signals and a corresponding queue is set up in memory or in a network interface card for outputting data at the detected bit rate. A channel timing module in the signal streaming device contains a two-stage dithered counter for each bit rate. The first stage of the counter counts one clock cycle longer than the second stage. By adjusting the ratio of the first stage and second stage counters in a fixed number of cycles (the dither cycle) a very precise average count is achieved. The average count is calculated to achieve the desired bit rate with a given packet size. Every time either the first stage of the second counter times out, a packet of data is sent to the corresponding queue in the network interface. As a result, the network interface is able to output packet isochronous signals with an average bit rate within one bit per second of desired bit rates between one megabit/second and 20 megabit/second and with a jitter of less than two milliseconds.

15 Claims, 8 Drawing Sheets

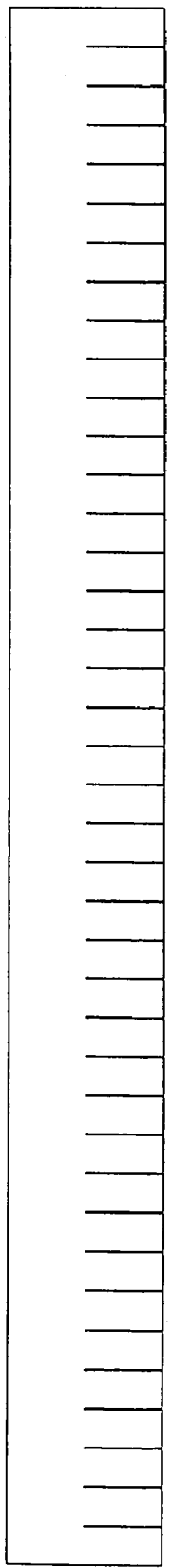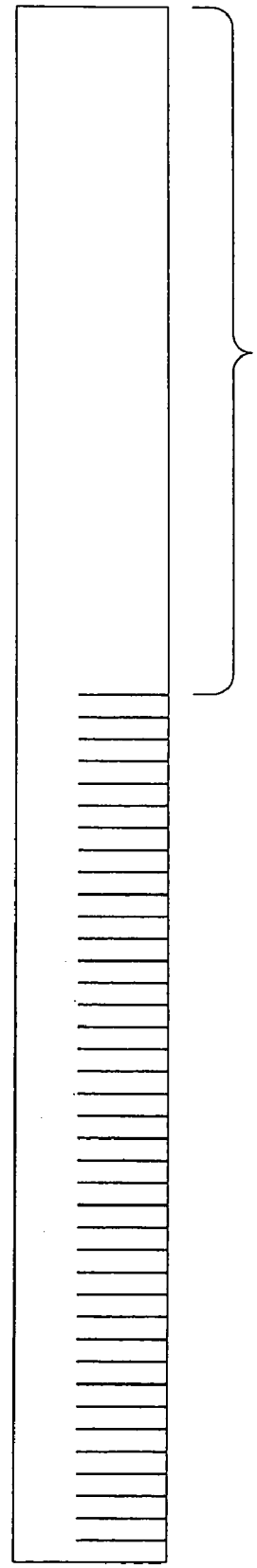
FIG. 1A
FIG. 1B

MULTI-CHANNEL VIDEO PUMP

CROSS-REFERENCE TO RELATED APPLICATION

This application is related to U.S. Provisional Application Ser. No. 60/112,866, entitled Multi-Channel Video Pump, by Timothy W. Dygert, filed Dec. 18, 1998 and is a continuation-in-part of U.S. patent application Ser. No. 09/226,169 now U.S. Pat. No. 6,473,441, entitled Multi-Channel Video Pump, by Timothy W. Dygert, filed Jan. 7, 1999, both incorporated herein by reference.

BACKGROUND OF THE INVENTION

1. Field of the Invention

The present invention is directed to streaming video signals and, more particularly, to an apparatus for simultaneously streaming user-specified video files encoded at varying bit rates over a single network.

2. Description of the Related Art

The role of streaming video in local area networks is expected to increase rapidly in the near future due to developments in video compression and deployment of transmission systems with increased bandwidth. Using the Moving Pictures Expert Group (MPEG) standards it is possible to compress an audio/video source in such a way that a constant bit rate stream is created. This stream can be captured and stored on appropriate media such as a redundant array of independent disks (RAID) or a digital video (or versatile) disc (DVD). The MPEG data stream then has to be reproduced at the encoding rate for use by playback devices.

The MPEG compression standards are used worldwide for constant bit rate digital video encoding. Decoding of MPEG video so that each picture and each audio frame is played once and only once relies on the ability to deliver each bit from the encoder to the decoder with a constant delay. This constant bit rate delivery is generally termed "isochronous streaming." In live broadcasts the encoder is responsible for generating the MPEG bit stream at the proper rate. However, when this information is stored for later playback another mechanism is required to "meter" the data from the storage media to the playback device. Normally, no feedback is provided to the sender by the receiver of MPEG video. The receiver depends on the transmission rate to be both smooth and accurate in order to decode MPEG video properly.

MPEG audio and video content may be recorded at any arbitrary rate. Some examples are streams that are 3.282, 3.420, 6.144, and 6.000 megabits per second. Some conventional systems use a handshake protocol to inform the receiving device what is the bit rate of the video stream that will be sent. However, that requires the receiving device to be programmed to use the protocol to communicate with the sending device. Other systems distribute the MPEG data in large "chunks" of data (up to tens of kilobytes) that require the receiving device to have enough expensive memory to buffer the data for smooth display. This type of delivery precludes using the MPEG System Clock synchronization mechanism which is required for precise playback.

Compressed video (e.g., MPEG-2) data is normally transmitted via satellite, cable, terrestrial digital broadcast and other transmission systems using serial bit stream mechanisms. In those systems, the data is clocked one bit at a time into the transmission data stream using the bit level clock of the transmission system. As a result, the average data rate is regulated directly by the bit level clock and the jitter is only that present on the bit level clock (normally substantially less than one millisecond). Jitter is a measurement of how early or how late a specific bit arrives from its intended arrival time.

The MPEG data streams that are sent on these type of transmission systems are multiplexed (with multiple programs and padding) so that the total MPEG stream rate is exactly the same as the network payload bit rate. An MPEG data stream cannot be as easily sent using an asynchronous transmission system or network like Ethernet or Asynchronous Transfer Mode (ATM), because such asynchronous networks operate on the packet (or cell) level rather than the bit level. Due to the use of packets to transmit data, it is more difficult to recover the input bit rate for a data stream from a network like Ethernet or ATM than from a multiplexed serial signal sent at a similar rate. A packet network will transmit an entire packet of MPEG data at the bit rate of the packet network, e.g., 155.52 Mb/s for ATM OC-3. In the best case, i.e., when the first bit of a packet is received at precisely the correct time, the maximum jitter of MPEG data in a packet will be determined by how much too early the last bit is received. Ignoring packet overhead, the formula for maximum jitter of the last bit when the first bit is on time is set forth in equation (1):

$$(\text{Packet Size/Stream Rate}) - (\text{Packet Size/Network Rate}) \qquad (1)$$

As apparent from this formula, jitter increases as the packet size increases and as the difference increases between the input data stream rate and the network transmission rate.

For example, in ATM OC-3 the smallest unit of data that can be sent is called a "cell", the bit rate is 155.52 Mb/s and the cell size is 53 bytes (roughly 48 payload and 5 overhead bytes). As a result, one ATM cell transmitted at 155.52 Mb/s typically contains 384 bits of MPEG data. Assuming a 3.42 Mb/s stream, if the first bit of MPEG data in an ATM cell is received at the correct time, the last MPEG data bit in the cell will be received early by 384/3.42 Mb/s−384/155.52 Mb/s, for a maximum jitter of about 0.11 ms. With 100 Mb/s Ethernet, the packet size is typically closer to 1000 bytes. So, for roughly 1000 bytes, the MPEG data stream created at 3.42 Mb/s, is sent at 100 Mb/s to produce a maximum jitter of 2.26 ms.

It is possible to use smaller packet sizes (with increased overhead) but the packets or cells will still be transmitted by ATM OC-3 and 100 Mb/s Ethernet far faster than the input MPEG data stream rate. To properly shape the data as it is introduced into the network, some network technologies, such as ATM, provide a traffic shaping mechanism. The specifics of how this mechanism works vary, but in general constant bit rates are metered to the network with some level of granularity. For a network interface running at OC-3 speed (roughly 155 megabits/sec) this granularity will be no better than about 40,000 bits/second. At one of the higher MPEG data rates of 6 megabits/second and assuming thirty frames per second with an average frame size of 200,000 bits, this granularity in the worst case would cause a full frame over-run or under-run every 5 seconds which is unacceptable for playback of high quality video. Thus, even in networks with robust "quality of service" mechanisms for providing constant bit rate transmission, it is not possible to rely on the inherent traffic shaping mechanism alone. Other network technologies such as IEEE 1394 have similar limitations.

A video distribution system using a packet network like 100 Mb/s Ethernet or ATM to transmit MPEG data to devices that are not programmed to use a handshake protocol must strike a balance between the size of receiving video buffers and the packet size, so as to keep overhead at an acceptable level and still provide a smooth flow of data. Once the packet size has been determined, the absolute minimum size of the receiving video buffer will be determined by the best-case jitter of the last bit, calculated using equation (1).

Furthermore, as the number of concurrent video streams in a given network segment increases, it is essential that each stream be well-behaved to maximize network efficiency. Well-behaved implies that each stream is as nearly isochronous as possible within the packet structure of the network. This is referred to as packet isochronous transmission. In a network with a large percentage of streaming traffic, bursty transmission of MPEG video streams in the network will result in congestion and network failure much more quickly than constant bit rate transmission. The more closely the individual data streams are maintained at a constant bit rate, the higher the total aggregate of such streams that can be carried on the network while maintaining a desired quality of service.

SUMMARY OF THE INVENTION

It is an object of the present invention to provide a video streaming device that can output video signals at an average rate within one bit per second of the rate at which the signal was encoded, for any bit rate in one bit per second increments.

It is another object of the present invention to provide a video streaming device that can output signals with different signal rates, each having a jitter of less than two milliseconds.

It is a further object of the present invention to provide a video streaming device capable of outputting multiple video signals at various rates using close to full maximum payload of the network that receives the video signals.

It is yet another object of the present invention to provide a video streaming device capable of outputting video signals to display devices with a minimal amount of buffer memory and without using a handshake protocol.

It is a still further object of the present invention to transmit multiple MPEG data streams, each in a near isochronous, or packet isochronous manner, such that appropriate decoders can properly recover the embedded system clock, decompress the MPEG data streams and re-create the original audio and video content.

The above objects can be attained by a system for transmitting multiple streams of stored signals to receiving devices, including at least one playback device to access recordings, each recording containing stored signals encoded at one of a plurality of bit rates; a streaming device, coupled to the at least one playback device, to receive a request to reproduce a specified recording, to detect the one of the bit rates used to encode the stored signals on the specified recording, and to output packet isochronous signals based on the stored signals on the specified recording at the one of the bit rates; and a network, coupled to the streaming device and the receiving devices, to deliver the packet isochronous signals to the receiving devices.

Preferably, the streaming device includes a plurality of timer circuits, each including a base counter to count a truncated period for transmission of packets; and a dithering circuit to indicate transmission of one of the packets one clock pulse later than the truncated period, a predetermined number of times within a dither cycle.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 1A and 1B together provide a timing diagram showing differences between desired MPEG data timing and the timing provided by a packet network.

DESCRIPTION OF THE PREFERRED EMBODIMENTS

Figure 2:
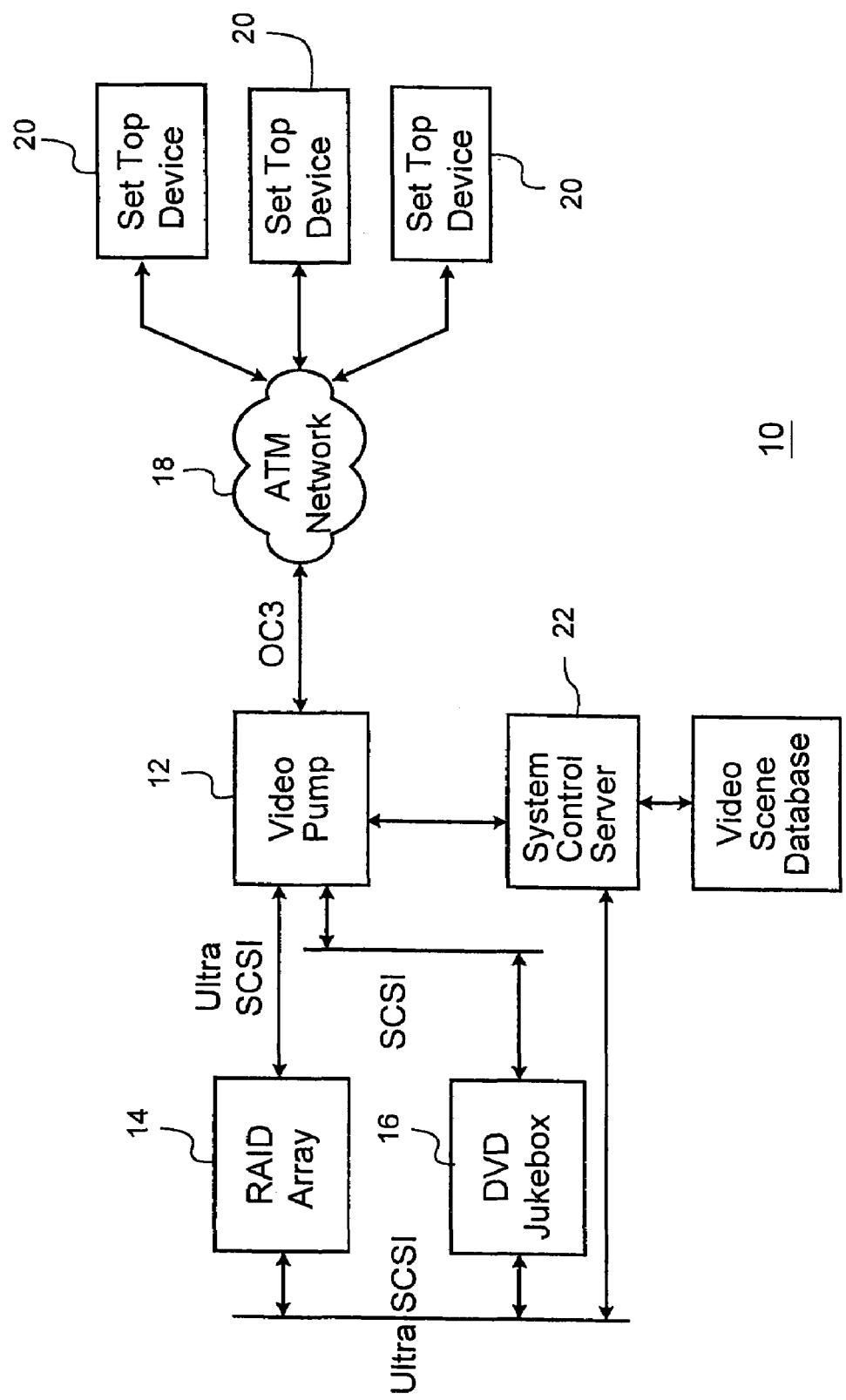
FIG. 2 is a block diagram of a digital media retrieval system using the present invention.

FIG. 1A illustrates the bit pattern desired for the MPEG stream (isochronous transmission). FIG. 1B illustrates the bit pattern for the same MPEG data stream as it is transmitted in a packet network, i.e., packet isochronous transmission. When the packet is released at precisely the correct time, as illustrated in FIGS. 1A and 1B, each bit after the first bit in each packet arrives early by an increasingly larger amount. The maximum early jitter occurs on the last bit of the packet. Ideally, the release of the next packet will be delayed, so that the first bit of the next packet will be received precisely "on time" by the receiving devices.

As should be apparent from the description of the related art above, the precise release point of a given packet will not have much effect on jitter as long as the magnitude of the error of actual release versus desired release is small compared to the jitter of the last bit caused by the difference between the network and stream bit rates, which will be referred to as the best case jitter of the last bit. As indicated in FIGS. 1A and 1B, the first bit can be released several bits early or late without changing the order of magnitude of the best case jitter of the last bit.

Another factor to be controlled is average bit rate. If a small packet is used to reduce the best case jitter of the last bit, the packets will be released at a higher frequency than required to transmit the same MPEG data stream using larger packets. In addition, the smaller the packet, the shorter the interval between packets, assuming the release of each packet is delayed so that the first bit of each packet is released at the correct time. A unidirectional error (i.e., always early or always late) in the period between releases is multiplied by the number of releases per second and thus, an accurate inter-packet time is key to maintaining a constant average bit rate.

If the size of the receiving MPEG data buffer was unlimited, the packet size could be large to reduce the frequency and the absolute timing tolerance per release. For example, if one packet were released per second, a one bit per second accuracy could be obtained using a 100 KHz clock and a 17-bit count down timer set for 100000. If this timer is off by one clock cycle, the error is only 1/100000. But, having a release at one second intervals using the example above creates a jitter of 966 ms for a 3.353 Mb/s stream.

If a packet size of 8000 bits instead of 3.353 Mbits as in the previous example is used for the same 3.353 Mb/s MPEG data stream, the packets must be released 419.125 times per second. It is more difficult to precisely achieve this rate. Again using a 100 KHz clock, the counter must count 238.5923054 clock pulses between the release of each packet. If the period is 238 clock pulses, 420.1680672 packets will be released per second for a bit rate of 3,361,344 bits per second. If the period is 239 clock pulses, 418.4100418 cells will be released per second for a bit rate of only 3,347,280 bits per second.

The amount of error resulting from a period of 238 or 239 clock pulses will preclude locking the decoder clock to the program clock reference (PCR) embedded in the MPEG data stream, since it would place the ratio of the decode clock to the display clock outside NTSC limits. Using a period of 239 clock pulses results in losing 5719 (3,353,000–3,347,280) bits per second which is a bit rate error of only 0.17% (5719/3,353,000). However, assuming a frame rate of 30, a 3.353 Mb/s MPEG data stream has an average frame size of 111,766 bits, leaving the receiving device one frame short every 19.54 (111766/5719) seconds. Thus, a frame hold would need to occur about every 20 seconds. For a fixed network speed, increasing the MPEG data rate, reducing the packet size or reducing the clock frequency used for timing packet releases will cause the error from a single stage counter to go up.

Illustrated in FIG. 2 is a block diagram of digital media retrieval system 10 using a two-stage timer mechanism which allows much higher counter resolution than a single stage counter with the same clock frequency. Digital media retrieval system 10 provides interactive distribution of video, text, graphics, and Internet content over a high speed digital network. Video pump 12 is a key component in system 10. The purpose of video pump 12 is to retrieve MPEG audio/video streams from various storage devices, such as RAID array 14 and DVD jukebox 16 and place this data into high speed digital network 18 for distribution to set top devices 20 at the specific rate required for each stream. Channels are opened in the system illustrated in FIG. 2 to transport data from the storage devices 14, 16 to set top devices 20 via ATM network 18. These channels may be PVC or SVC channels, such as CBR PVC 6 Mb/s channels. Video pump 12 responds to system commands from system control server 22 for the retrieval and distribution of isochronous data including both audio and video. For simplicity's sake, this data will subsequently be referred to as either video or simply as data. Although illustrated as separate components in FIG. 2 that may be networked, it is possible to construct video server 10 such that video pump 12 and system control server 22 are in the same computer system.

ATM network 18 is able to establish end-to-end connections with guaranteed bandwidth availability and requires that data is introduced to ATM network 18 in such a way that the established connection rate is not exceeded. If the bit rate of a specific connection exceeds that agreed to when the connection was established ATM network 18 may discard the excess data. The timing mechanism of the present invention used in conjunction with the ATM interface provides MPEG data streaming that meets all required specifications for bit rates between roughly 1 and 20 megabits per second.

Video pump 12 may be strictly a server, with commands received via a command protocol over TCP/IP, such as real time streaming protocol (RTSP). These commands open and close video streams, assign video streams to specific PVC/SVC channels, and perform actions on these video streams, such as pause, play, stop, fast forward, rewind, etc. Video pump 12 receives via the commands, the start and stop addresses of the data within a given file that is to be streamed through ATM network 18. Video pump 12 provides timing to allow each individual channel to be streamed at unique, arbitrary rates. In this embodiment, a maximum of 60 channels may be streamed, with a maximum total aggregate bit rate of 120 Mb/s. The timing for each channel may be specified via the application program interface (API) executing on system control server 22 or set top device 20, or determined directly from the stream itself by video pump 12 using the program clock references (PCRs) that are stored in MPEG transport stream data at least every 100 milliseconds. Video pump 12 can determine the bit rate of the signal by the number of bits between PCRs and the difference in time between the PCRs. Video pump 12 can operate on blocks of data as small as two MPEG transport packets (376 bytes) to minimize jitter imposed by the distribution of video within the system and to comply with ATM Forum requirements for MPEG-2 transmission.

Figure 3:
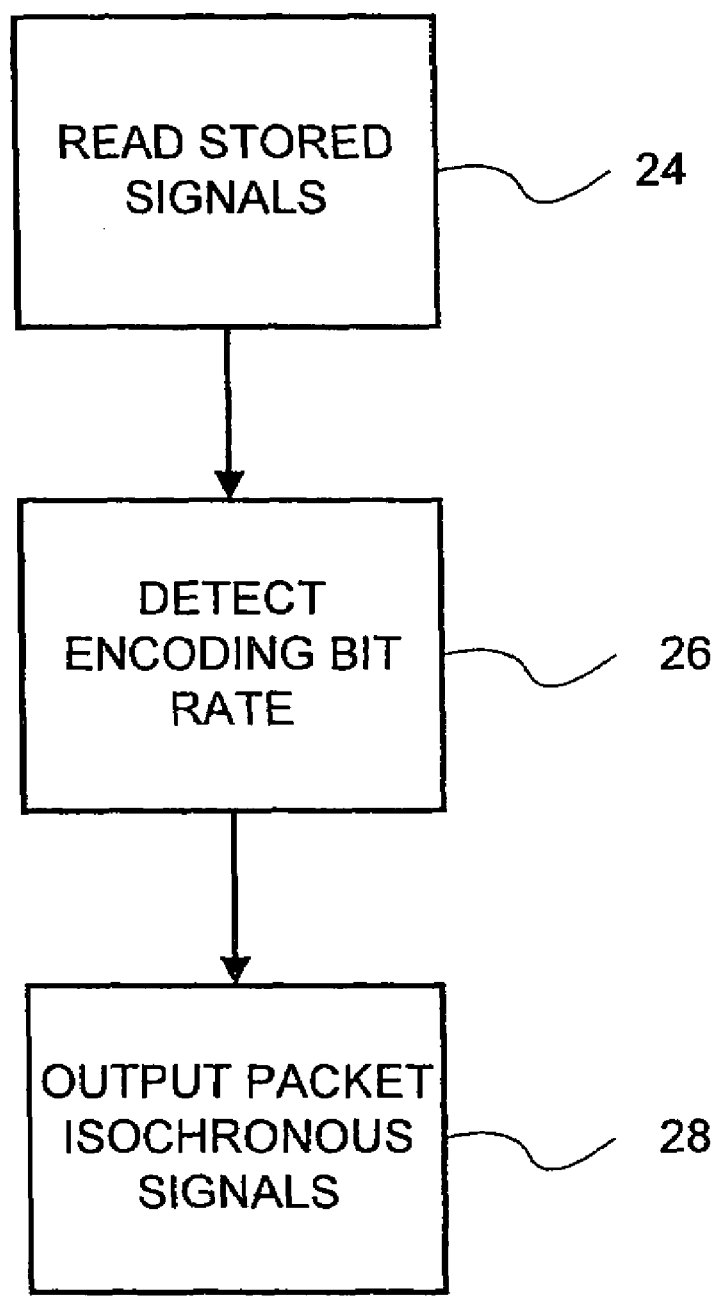
FIG. 3 is a flowchart of the operation of a video streaming device according to the present invention.

The basic procedure for generating a stream of packet isochronous signals according to the present invention is illustrated in FIG. 3. Stored signals are read 24 from a recording that has been specified for playback in a conventional manner. Then, the bit rate used to encode the stored signals on the recording is detected 26 by detecting the PCRs. Finally, the stream of packet isochronous signals is output 28 with timing more precise than the clock signals in the device, by using a two-stage timer, as described below.

Figure 4:
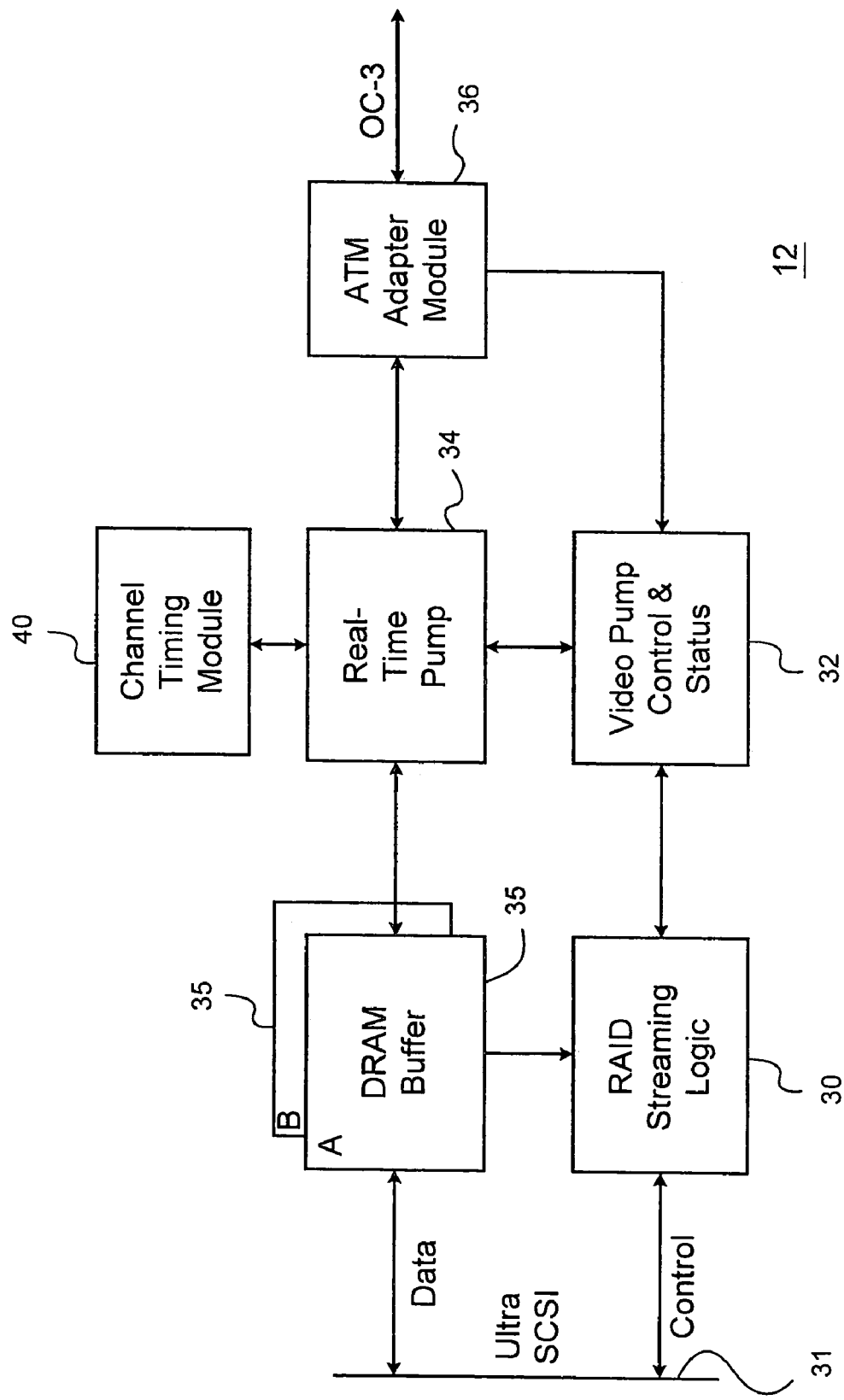
FIG. 4 is a functional block diagram of a video streaming device according to the present invention.

A functional block diagram of video pump 12 is shown in FIG. 4. Video pump 12 has four main functional components that operate as individual processes. RAID streaming logic 30 issues and receives control signals to and from ultra SCSI interface 31 and sends status information to control and status logic 32. Real-time pump 34 receives data from DRAM buffer 35 and data rate information from RAID streaming logic 30 and outputs the data and a channel identifier to ATM adapter 36. Control and status logic 32 also receives status information from real-time pump 34 and ATM adapter module 36 and issues commands to RAID streaming logic 30, real-time pump 34 and ATM adapter module 28. For example, start and stop addresses and start and stop commands are sent to RAID streaming logic 30, open and close channel commands and parameters including a priority list of counter values are sent to real-time pump 34 and open and close channel commands and parameters indicating channel bandwidth are sent to ATM adapter module 36.

RAID streaming logic 30 fetches data from RAID array 14. This data is placed in DRAM buffer 35 where it is read by real-time pump 34. RAID streaming logic 30 receives start and stop commands, as well data addresses from video pump control and status logic 32. RAID streaming logic 30 preferably reads data including PCRs from the video file to determine the encode rate, and passes this rate on to real-time pump 34. The encode rate is the rate at which the set top device decoder will use the data, and it is therefore the rate at which video pump 12 must send the data to the decoder, as described in more detail below. RAID streaming logic 30 also ensures that the data being read from RAID array 14 is transport packet aligned. This is crucial to the operation of video pump 12, and any errors are immediately reported to control and status logic 32.

Real-time pump 34 is the heart of video pump 12. It is here that the data for each channel is pulled from the DRAM buffers 35 for each channel at the specified rate. Data for each channel is passed from real-time pump 34 to buffers in ATM adapter module 36 for insertion into ATM distribution network 18. In an exemplary design described below, real-time pump 34 is capable of maintaining 60 separate video streams, each with arbitrary data rates, and processing the data flow in such a manner to minimize jitter as the data is placed in the stream. In this embodiment real-time pump 34 is capable of maintaining an aggregate data flow bandwidth of 120 Mbps.

ATM adapter module 36 receives the video data from real-time pump 34, packetizes this data into ATM cells, and passes this data stream on to ATM network 18 for distribution to set top devices 20. The data received from real-time pump 34 is in the form of MPEG transport stream packets, and the ATM encapsulation is performed according to AAL5. The output of ATM adapter module 36 is coupled to OC-3c fiber.

A network interface device traffic shaper in ATM adapter module 36 is initialized so that for the current channel it will introduce data into the network at the closest rate to the required rate that is higher than the required rate. Channel timing module 40 provides a signal to transfer the data block to the network interface device traffic shaper in ATM adapter module 36 each time the timer for a channel expires. The result is that each block of data is introduced to the network at a rate that is faster than desired. However, because only data that has been transferred to the network interface device can be sent, from time to time there will be no data available to the traffic shaper. This will result in no data being sent until the next block of data is made available. The resulting data stream will consist of a period when data is being sent too fast followed by a period in which no data is sent. Over time, the desired data rate will be achieved to the precision of the channel timing module 40, as described below.

If real-time pump 34 is the heart of a video streaming device according to the present invention, then control and status logic 32 serves as the brains for video pump 12 by coordinating and directing all internal elements and processes. Control and status logic 32 provides the interface to the "outside world", receiving commands and passing status to other elements within digital media retrieval system 10. Control and status logic 32 processes these system level commands, generating local commands as required to the other functional elements of video pump 12.

Figure 5:
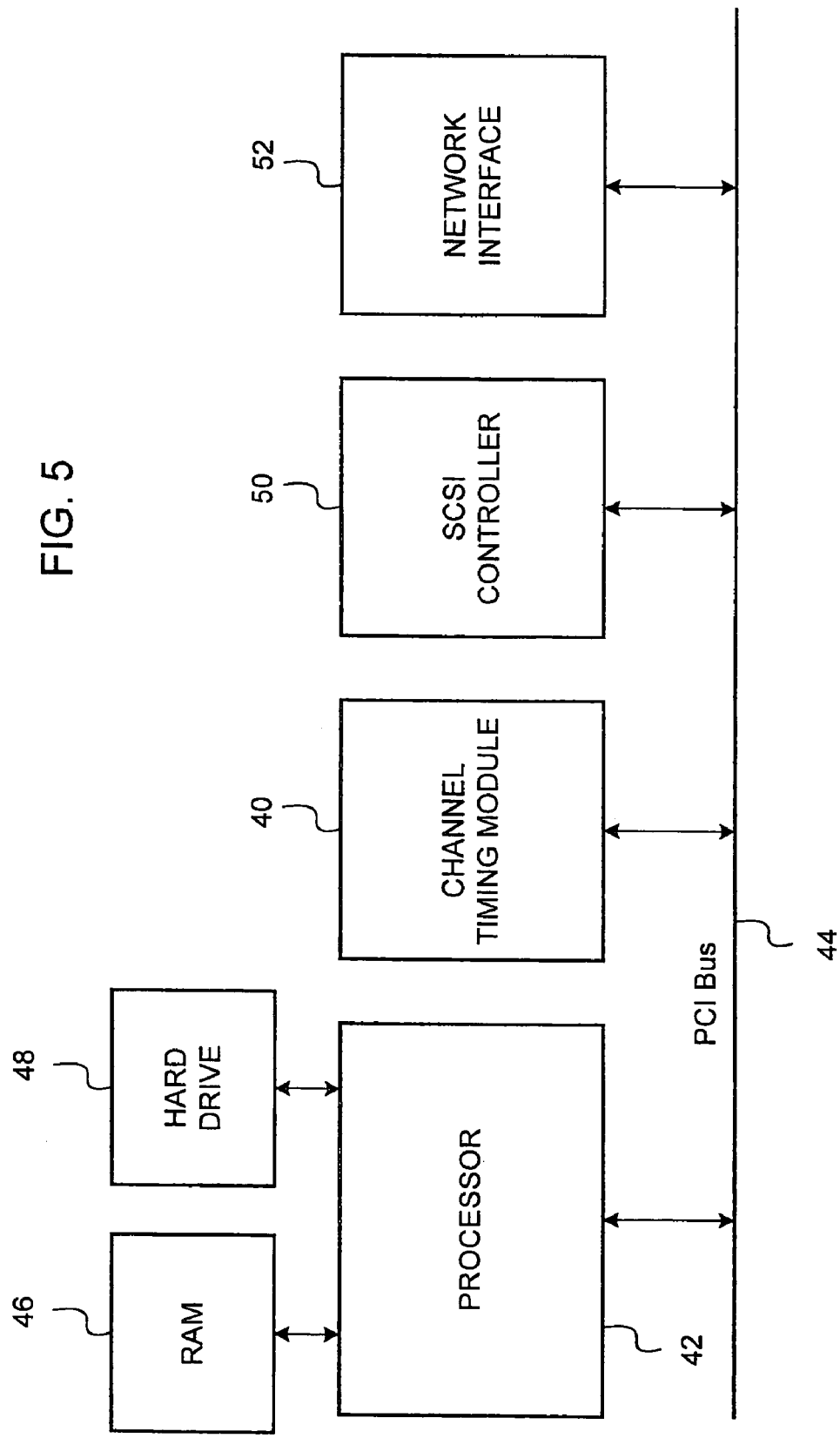
FIG. 5 is a block diagram of the hardware architecture of a video streaming device according to the present invention.

A block diagram of the hardware architecture of a video streaming device (video pump) according to the present invention is illustrated in FIG. 5. The functional components illustrated in FIGS. 2 and 4 correspond to the physical components illustrated in FIG. 5 as follows. Video pump 12 may be constructed using a standard "IBM PC" type Intel® Pentium® platform with processor 42 connected to PCI bus 44. Channel timing module 40 which implements multiple two-stage timers may be a custom PCI interface card inserted into PCI bus 44. DRAM buffers A and B 35 are provided by RAM 46. Hard drive 48 stores an operating system, such as Windows® NT 4.0 and pump software executed by processor 42 to provide the functions of video pump control and status logic 32, real time pump 34, RAID streaming logic 30 and system control server 22. SCSI controller 50 provides an interface to devices, such as a RAID storage unit (not shown) connected via ultra SCSI 31. Network interface 52 corresponds to ATM adapter module 36. An Ethernet network interface (not shown) may also be included to provide for external control by a separate system control server 22. As will be apparent to one of ordinary skill in the art, the components illustrated in FIG. 5 can be replaced with different components capable of performing the functions illustrated in FIGS. 2 and 4 with greater or less capacity, depending on the requirements of the system in which they operate.

Figure 6:
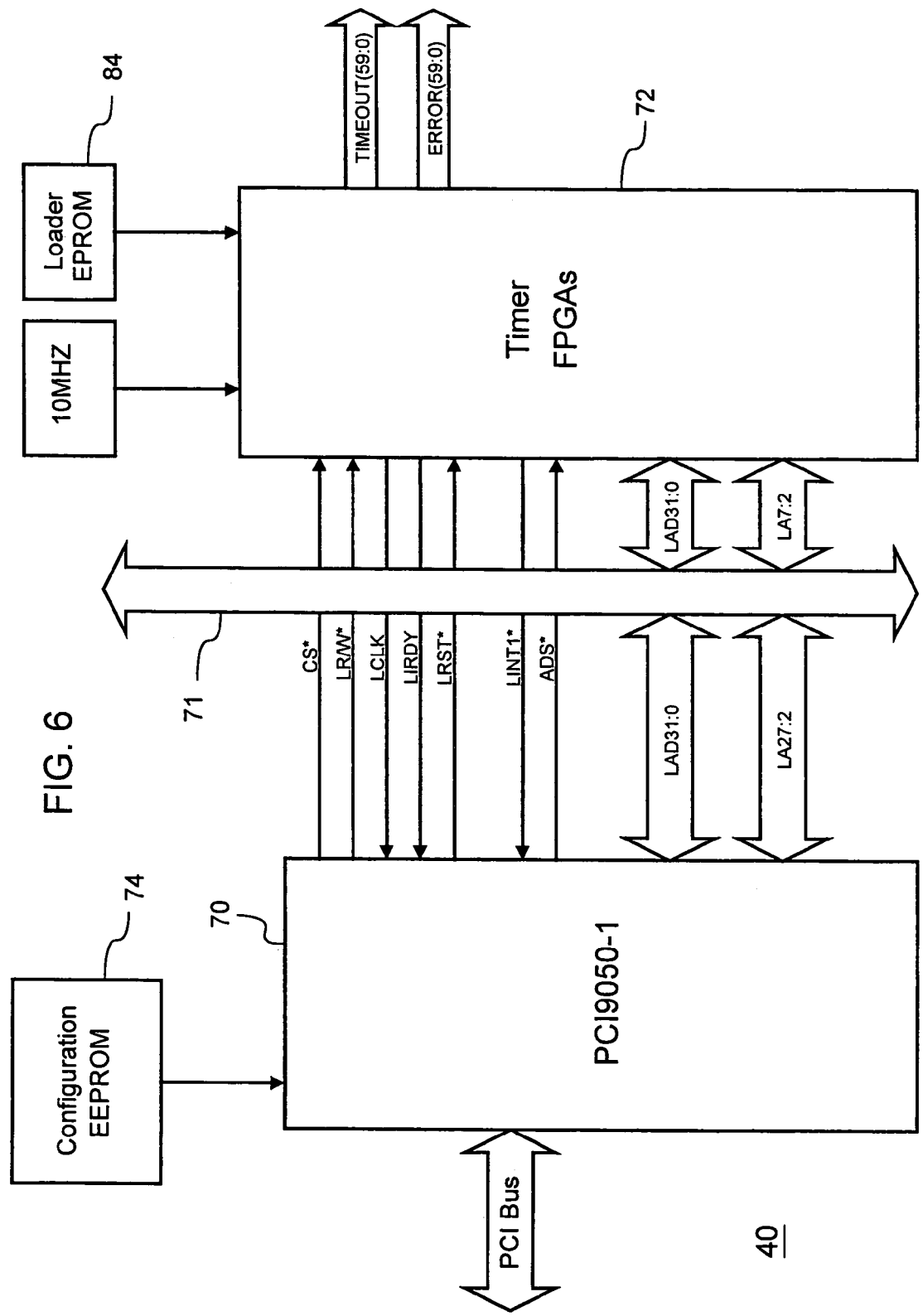
FIG. 6 is a block diagram of a channel timing module according to the present invention.

An example of channel timing module 40 on a PCI timer card is provided in FIG. 6. In this example PCI interface 70 is provided by a PLX Technology PCI9050-1 PCI bus target interface, compliant to PCI Specification 2.1, to connect channel timing module 40 to PCI bus 44. PCI interface 70 is a PCI slave interface providing a bridge to local bus 71. PCI configuration registers (not shown separately) in PCI interface 70 are mapped to I/O space. All resources in channel timing module 40 are preferably 32 bit accessible. As described in the example below, local bus 71 preferably is clocked at 10 MHZ, enabling jitter to be reduced to a desired level. Timing of local bus accesses are determined by timer FPGA 72 in the manner described below.

The initial configuration of channel timing module 40 is loaded from configuration EEPROM 74 attached to PCI interface 70. The following fields in the PCI configuration registers (not shown) are loaded from configuration EEPROM 74 at power up: Device ID, Vendor ID, Class Code, Subsystem ID, Subsystem Vendor ID, and Interrupt Pin. These registers are reloaded at every instance of PCI Reset signal assertion. Configuration EEPROM 74 may be a Fairchild Semiconductor NM93CS46 which holds 1024 bits of information. The data within the device may be altered via registers within PCI interface 70, depending on the state of the protection register within EEPROM 74.

Figure 7:
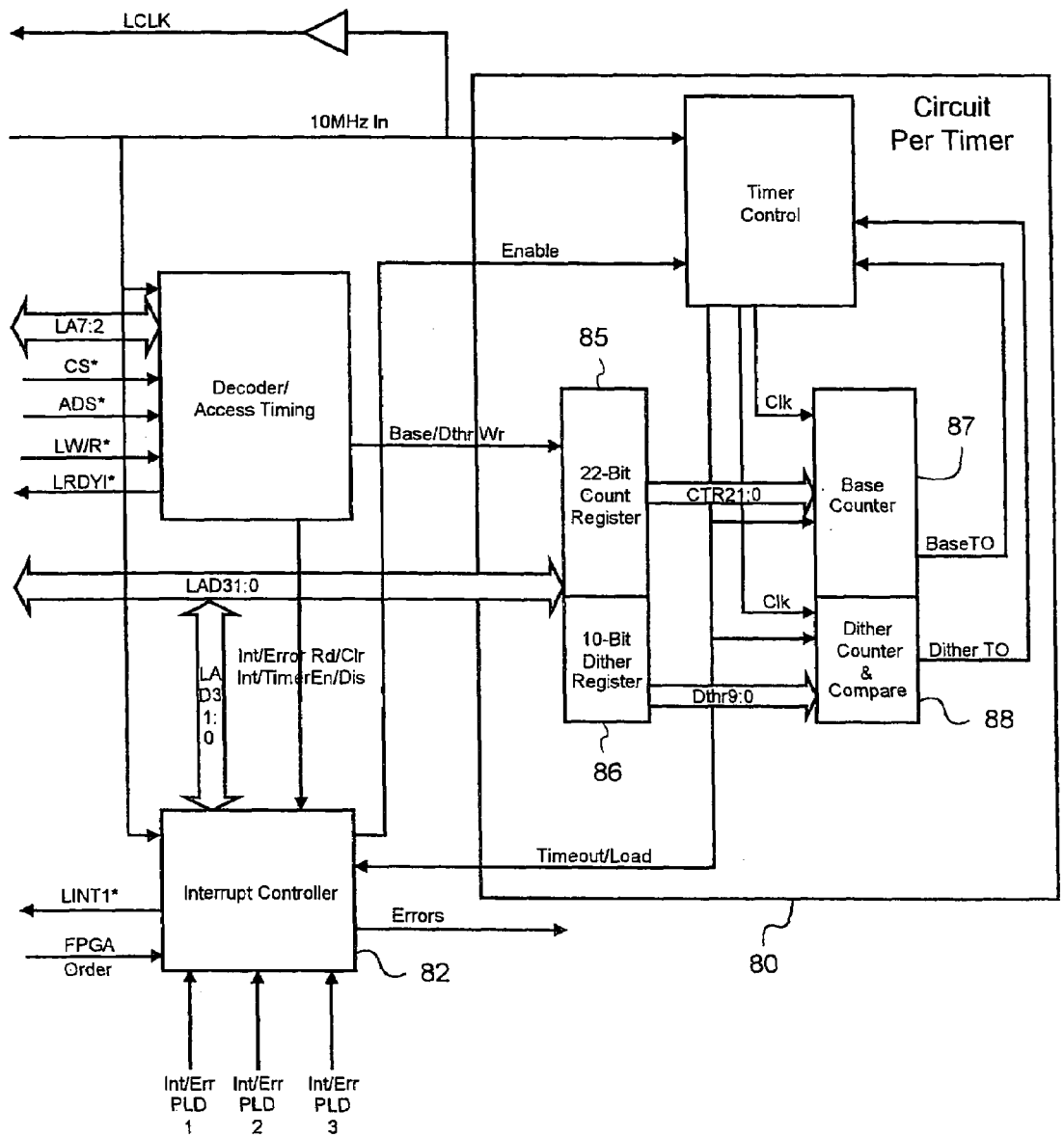
FIG. 7 is a block diagram of one set of channel timing counters in a video streaming device according to the present invention.

Several Altera EPF6024A FPGAs 72 are included in channel timing module 40. A partial block diagram of timer FPGA 72 is shown in FIG. 7. Each FPGA 72 contains 15 timers 80, one of which is illustrated in FIG. 7, interrupt controller 82 and an interface (not shown) to local bus 71. Each timer FPGA is configured upon reset via loader EPROM 84 (FIG. 6) which may be provided by Altera EPC1441 devices each containing 400K×1 bits of information.

In the embodiment described below, the dither cycle used by timer circuit 80 is 1024 and the clock rate is 10 MHZ. Operation of each circuit timer 80 in channel timing module 40 is initiated by processor 42 (FIG. 5) loading count data, consisting of a 22-bit count value and a 10-bit dither value, into corresponding registers 85, 86 in channel timing module 40 via PCI bus 44. Upon timeout (explained below) an interrupt is generated for processor 42 to read interrupt status registers in channel status logic (not shown) to determine which timer circuit 80 has timed out.

Each timer circuit 80 consists of two counters: base counter 87 and dither counter 88. Timer circuit 80 begins operation when the 22-bit count value and 10-bit dither value have been written in registers 85, 86 and the 22-bit count value is transferred to base counter 87. Dither counter 88 is initially set to all ones (1023 decimal). During operation, base counter 87 is decremented at each cycle of the 10 MHZ clock. When base counter 87 reaches zero, a compare is performed between the 10-bit dither value in register 86 and dither counter 88. If dither counter 88 is less than or equal to the 10-bit dither value a timeout occurs. The timeout is delayed by one clock cycle when dither counter 88 is greater than the 10-bit dither value in register 86. Dither counter 88 is decremented at each timeout. Base counter 87 is reloaded with the 22-bit count value in register 85 at each timeout. Dither counter 88 is 10 bits wide and thus, automatically resets to its maximum value every 1024 timeouts. An interrupt for the timer circuit 80 is generated each time the timeout occurs if the interrupt has been enabled by setting the appropriate bit in the interrupt control register. Therefore, an average timeout period is defined by formula (2), where Base is the 22-bit count value in register 85 and Dither is the 10-bit dither value in register 86.

$$Period=(Base*(1024-Dither)+(Base+1)*Dither)/(Clk*1024) \quad (2)$$

In the above example of a 3.353 Mb/s MPEG data stream transmitted over an appropriate network having a transmission rate higher than the MPEG data rate in packets of 1000 bytes (8000 bits), a packet should be released 3,353,000/8000 or 419.125 times per second. Using a 100 kHz clock (to be consistent with the earlier example), 100,000/419.1241778 or 238.5923054 clock signals are counted for each time a packet is released. The fractional part is 0.5923054. Multiplying the fractional part by 1024 (the number of packets released during one dither cycle of timer circuit 80) produces 606.52 which can be rounded to 607. This is the number of times out of 1024 that the count will be 239. The number of counts at 238 is (1024−607)=417. The average count over 1024 releases in this example can be calculated by formula (3) as 238.59.

$$((607*239)+(417*238))/1024=238.59277 \quad (3)$$

Thus, channel timer circuit 40 will release an 8000 bit packet of MPEG data on the average of 419.1241778 times per second (100,000/238.59277). Therefore, the average data rate (over an integral number of 1024 releases) is 419.1241778×8000=3,352,993.4 bits per second. In this example, the present invention is able to reduce the bits per second error from 5917 to 6.6 bits per second or about three orders of magnitude using the same clock frequency.

To further reduce the error in average bit rate, e.g., to within one bit per second, the clock frequency can be increased. Increasing the clock frequency to 10 MHz reduces the error in the above example to 0.01 bit per second. Using the 10 MHz clock, the problem still requires a release of 8000 bits 419.125 times each second. The number of clock pulses per timeout is 10,000,000/419.125 which is 23,859.23054. The fractional part is 0.23054. Multiplying the fractional part by 1024 produces 236.07 which can be rounded to 236. This is the number of times out of 1024 that the count will be 23860. The number of counts out of 1024 at 23859 is 788 (1024−236). The average over 1024 timeouts (one dither cycle) is ((236*23860)+(788*23859))/1024 which is 23,859.23047. The number of releases per second is 10,000,000/23859.23047 or 419.1250012. This makes the average bit rate 419.1250012*8000 or 3,353,000.01.

There is a cyclic jitter associated with this method that is very low. This jitter is nulled out each 1024 clock cycles (one dither cycle) and only amounts to a few bit times which is insignificant.

Timer 80 will start counting upon loading the base and dither counter values into base and dither counters 87, 88. This must be done as a single 32 bit write. In fact, the value loaded into base counter 86 is the desired value minus one, since the check for timeout occurs after each clock cycle. For simplicity in the description above this detail was ignored. Timer 80 may be stopped by writing all zeroes to 22-bit base count register 85. The local bus interface in each timer FPGA 72 provides the timing and address decode for accesses to resources of timer FPGA 72. The local bus is clocked from the same 10 MHz source that drives the timers.

Note that it is important to look at a range of bit rates to see the various effects discussed above. For certain values, it is possible to get very low errors using low clock rates and single stage timers. However, timing module 40 produces very close results for all combinations within a wide range of bit rates. For example, using a dither cycle of 1024 and a clock rate of 10 MHz, it is possible to control output of video data in 8000 bit packets onto an ATM OC-3 network for video data rates of 2 to 20 Mb/s with a maximum average data rate error that is less than one bit per second.

It should also be clear from this example that attempting to do the fine grained timing required to get the data rate correct is not practical with conventional general purpose operating systems. The hardware embodiment described above maintains each counter precisely and independently of the processor. Characteristics of the operating system and speed of the host computer will determine how closely to scheduled time each packet is actually released. However, any error in release time of a given packet is not cumulative since the timers reset automatically at the end of each cycle and are completely independent of the main processor and operating system.

Figure 8:
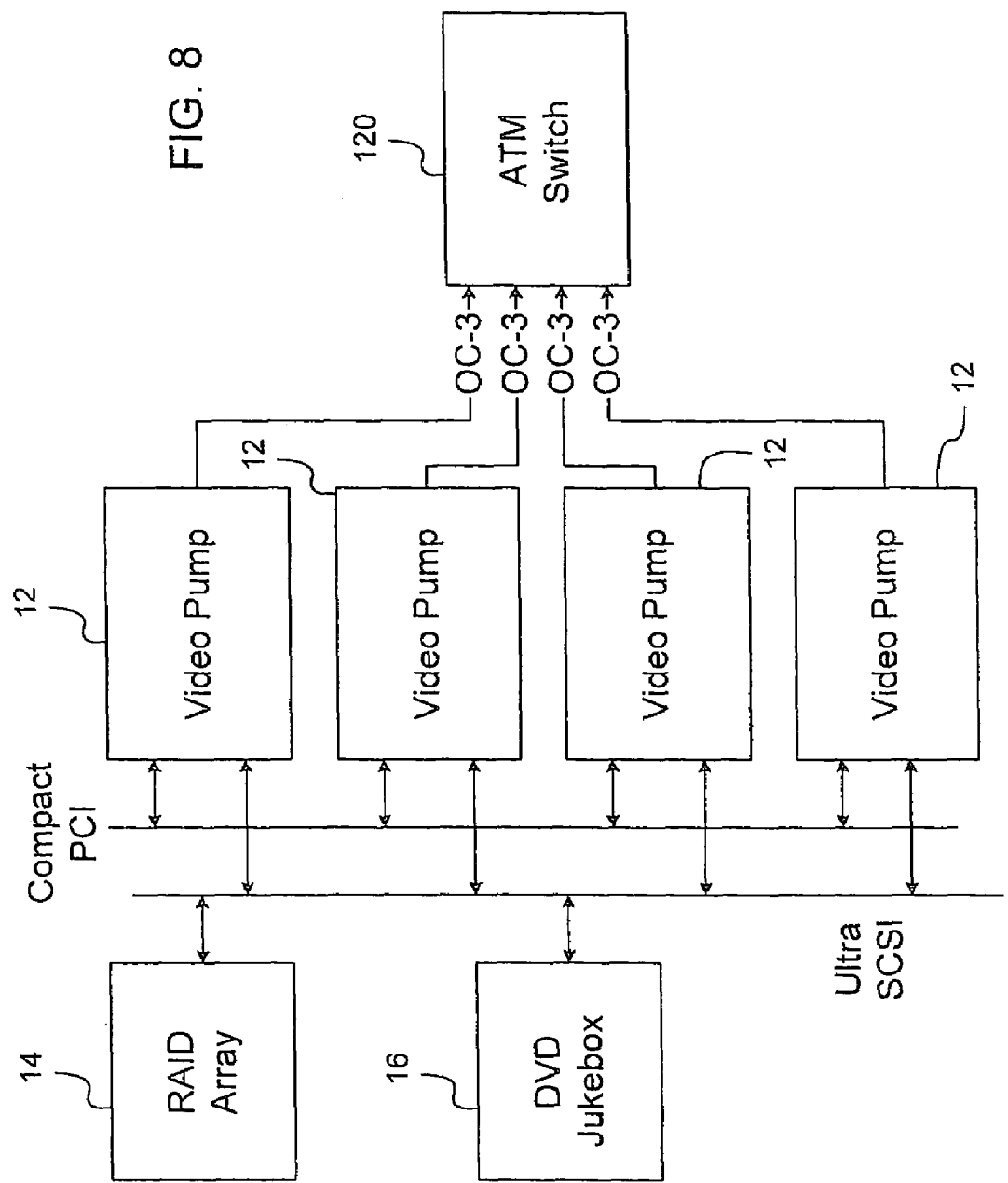
FIG. 8 is a block diagram of a digital media retrieval system using multiple video streaming devices to produce video streams with a total of 480 megabits per second.

The present invention is scalable by combining multiple video pumps 12 connected to a single ATM switch 120, as illustrated in FIG. 8. Video pumps 12 may be connected to one or more storage devices, such as RAID array 14, DVD jukebox 16, and other devices, such as compact disc changers, not shown.

The many features and advantages of the invention are apparent from the detailed specification and, thus, it is intended by the appended claims to cover all such features and advantages of the invention which fall within the true spirit and scope of the invention. For example, the disclosed embodiment is used with an Asynchronous Transfer Mode (ATM) network that is able to support multiple constant bit rate streams per segment as well as the bursty traffic created by more traditional network traffic. The present invention is not limited to use with ATM networks, but could be used with any network that can deliver the required amount of data. The quality of delivery will be dependent on the quality of service provided by the network. New protocols for TCP/UDP over switched and gigabit Ethernet networks may eventually support a quality of service provided by ATM networks, but presently an Ethernet network will be able to transmit a smaller number of high quality video streams per network segment than ATM and will be adversely affected by other network traffic. The present invention will work very well on any network with high quality of service capabilities including IEEE 1394 and networks conforming to the Home PNA V 2.0 specification. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An apparatus to output multiple streams of stored signals, each stream encoded at one of a plurality of bit rates and read from recordings, comprising:

a streaming device to detect which of the bit rates is used to encode each respective stream of the stored signals on the recording and to output each stream as packet isochronous signals at the one of the bit rates for that respective stream, wherein the streaming device outputs each stream of the packet isochronous signals with an average bit rate within one bit per second of the one of the bit rates used to encode that respective stream.

2. An apparatus as recited in claim 1, wherein said streaming device outputs each stream of the packet isochronous signals with a jitter of less than two milliseconds.

3. An apparatus as recited in claim 1, wherein said streaming device comprises a plurality of timer circuits, each including
- a base counter to count a truncated period for transmission of packets; and
- a dithering circuit to indicate transmission of one of the packets one clock pulse later than the truncated period, a predetermined number of times within a dither cycle.

4. An apparatus for simultaneously reproducing multiple recordings from storage devices for transport on a network, comprising:
- buffers to receive stored signals from the multiple recordings, each recording containing stored signals encoded at one of a plurality of bit rates;
- a control unit, coupled to said storage devices, to receive requests to reproduce the multiplied recordings and to control playback of the stored signals by the storage devices;
- a real-time pump, coupled to said buffers and said control unit, to detect which of the bit rates is used to encode the stored signals on each of the respective multiple recordings and to output sport stream packets, each transport stream packet based on the stored signals from one of the multiple recordings;
- a network interface, coupled to said control unit and said real-time pump, to receive the transport stream packets in corresponding queues and to output over the network multiplexed packet isochronous signals corresponding to the stored signals on the multiple recordings requested to be reproduced, each stream of the packet isochronous signals on the network having an average bit rate of the one of the bit rates used to encode the stored signals corresponding thereto; and
- a channel timing module, coupled to said real-time pump, to control timing of output of the transport stream packets, wherein said channel timing module comprises a plurality of two-stage counters and channel status logic units corresponding to said two-stage counters.

5. An apparatus as recited in claim 4, wherein said network interface outputs each stream of the packet isochronous signals with the average bit rate within one bit per second of the one of the bit rates used to encode the stored signals corresponding thereto.

6. An apparatus as recited in claim 4, wherein said network interface outputs each stream of the packet isochronous signals with a jitter of less than two milliseconds.

7. An apparatus as recited in claim 4, wherein each two-stage counter corresponds to one of the plurality of bit rates.

8. An apparatus as recited in claim 4, wherein at least one of the two-stage counters further comprises:
- a base counter to count a truncated period for mission of packets; and
- a dithering circuit to indicate transmission of the transport stream packets within a corresponding stream one clock pulse later than the truncated period, a predetermined number of times within a dither cycle.

9. A system for transmitting multiple streams of stored signals to receiving devices, comprising:
- at least one playback device to access recordings, each recording containing stored signal encoded at one of a plurality of bit rates;
- a streaming device, coupled to said at least one playback device, to receive requests to reproduce specified recordings, to detect the one of the bit rates used to encode the stored signals on each of the specified recordings, and to output a stream of packet isochronous signals based on the stored signals of the specified recordings at the one of the bit rates for each of the specified recordings, wherein said streaming device outputs each stream of the packet isochronous signals with an average bit rate within one bit per second of the one of the bit rates at which the corresponding recording was encoded; and
- a network, coupled to said streaming device and the receiving devices, to deliver each stream of the packet isochronous signals to the receiving devices.

10. A system as recited in claim 9, wherein said streaming device outputs each stream of the packet isochronous signals with a jitter of less than two milliseconds.

11. A system as recited in claim 9, wherein said streaming device comprises a plurality of timer circuits, each including:
- a base counter to count a truncated period for transmission of packets; and
- a dithering circuit to indicate transmission of one of the packets one clock pulse later than the truncated period, a predetermined number of times within a dither cycle.

12. A method of transmitting multiple streams of stored signals to receiving devices, comprising:
- reading the stored signal from recordings, each recording encoded at one of a plurality of bit rates;
- detecting the one of the bit rates used to encode the stored signals for each respective stream; and
- outputting to the receiving devices each stream of stored signals as packet isochronous signal at the one of the bit rates for that respective stream, wherein each stream of the packet isochronous signals is outputted with the average bit rate within one bit per second of the one of the bit rates used to encode that respective stream.

13. A method as recited in claim 12, wherein said outputting outputs each stream of the packet isochronous signals with a jitter of less than two milliseconds.

14. A method as recited in claim 12, wherein said outputting of each packet of isochronous signals occurs on a timing pulse produced from clock pulses generated at a clock rate, the timing pulse produced with an average period of greater precision than the clock rate.

15. A method as recited in claim 13, further comprising producing timing pulses by
- counting the clock pulses for a truncated period based on the average period; and
- generating the timing pulses one clock pulse later than the truncated period, a predetermined number of times within a dither cycle.

* * * * *